March 26, 1935. A. FLEISCHER 1,995,343
APPARATUS FOR MANUFACTURE OF BASIC ALUM
Filed June 30, 1933
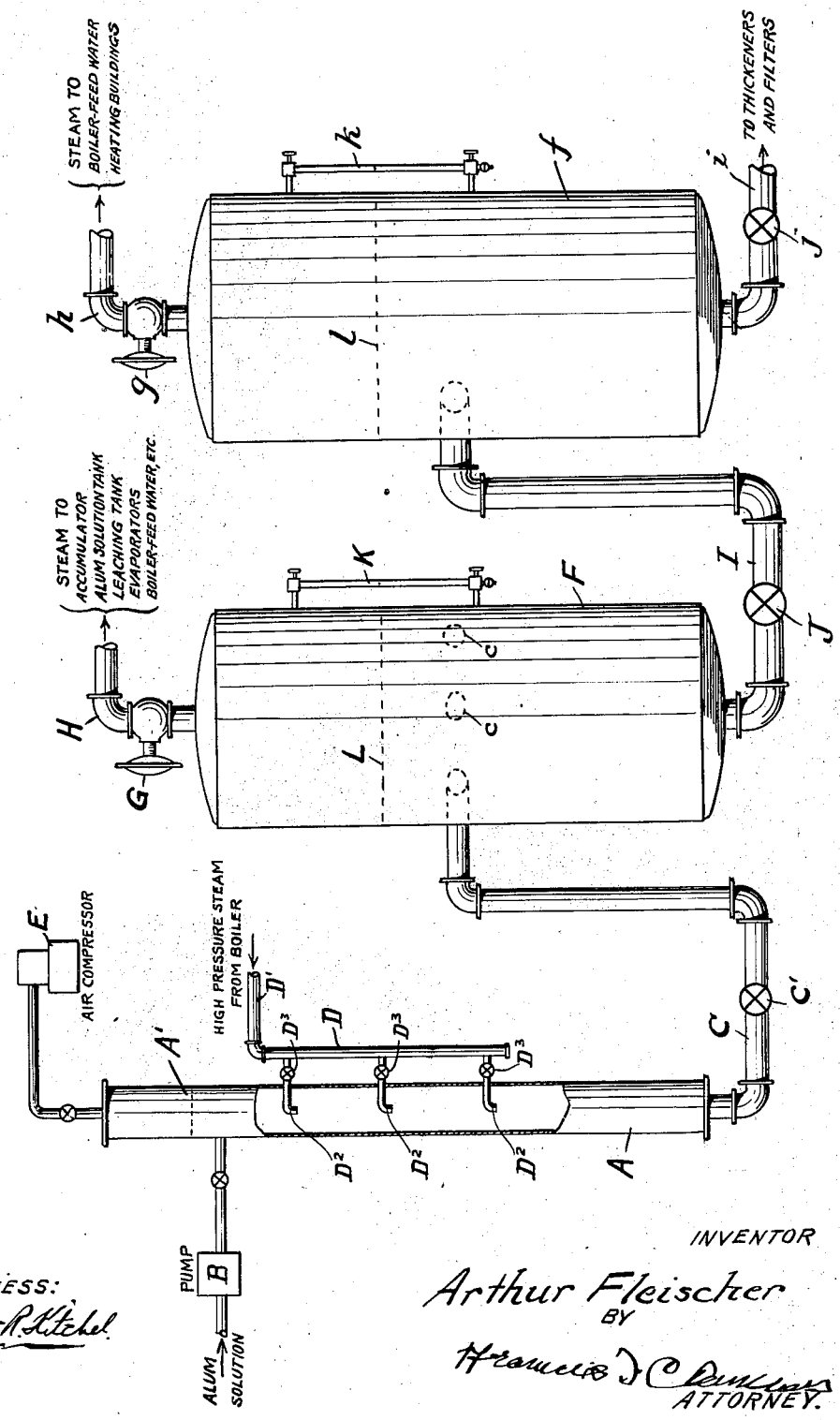
INVENTOR
Arthur Fleischer
BY
ATTORNEY.

Patented Mar. 26, 1935

1,995,343

UNITED STATES PATENT OFFICE 1,995,343

APPARATUS FOR MANUFACTURE OF BASIC ALUM

Arthur Fleischer, Hartford, Conn., assignor to Kalunite Company, Philadelphia, Pa., a corporation of Delaware Application June 30, 1933, Serial No. 678,418

5 Claims. (Cl. 23—260)

My invention relates to the manufacture of basic alum by the process in which an autoclave is charged with a solution of a normal alum, which solution is then raised to a reactive temperature at which basic alum (for example,

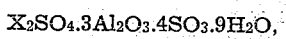

$X_2SO_4.3Al_2O_3.4SO_3.9H_2O$, in which X equals alkali metal or ammonium), is precipitated from the solution and a mother liquor formed which contains a large percentage of the sulphur trioxide component of the normal alum, a large proportion of the alkali and or ammonium sulphate constituent of the normal alum and a percentage of undecomposed alum. For practical purposes, it is necessary to raise the contents of the autoclave to a temperature in excess of 140°, preferably to 200° C. and, for obvious reasons, it is desirable to promptly discharge the autoclave on the practical completion of the reaction.

The best method of carrying on the process indicated above is, I believe, that disclosed in the United States application of Gordon R. Steuart, Serial Number 606,786, filed April 22, 1932, now Patent No. 1,964,389, the leading features of which are, in the first place, the heating of the contents of the autoclave to the necessary reactive temperature by means of the injection into the autoclave of high pressure steam and, second, the maintenance through the autoclave of a constant flow of the alum solution and the residual products of the process so that the autoclave is constantly receiving normal alum solution and discharging the precipitate and mother liquor resulting from the reaction.

It will be obvious that where the reaction products are discharged from the autoclave approximately at the pressure and temperature of the reaction, that the reaction mixture has a heat content of very considerable potential value. It is also true that it is desirable to effect a concentration of the mother liquor which contains considerable values both in its sulphuric acid content and in its other components and, again, it is important that steam should not be permitted to evolve freely at atmospheric pressures from the reaction produced as, under such conditions, it would carry with it a detrimental and unpermissible fog of sulphuric acid.

The object of my invention is to provide for the utilization of the heat values of the reaction product under conditions which will bring about the concentration of the mother liquor and avoid the production of a sulphuric acid fog and my invention consists, broadly speaking, in the provision of a pressure reducing receptacle connected to the autoclave or autoclaves used in the described method of manufacturing basic alum so as to receive the contents thereof after the completion of the reaction, said receptacle being provided with means for maintaining therein a constant steam pressure materially less than that of the reaction product leaving the autoclave, said receptacle being also provided with a steam conduit connectable to points of use for steam and with a regulable outlet conduit for the outflow of the liquid and solid contents of the receptacle. By preference, I also connect this first receptacle with a second receptacle, similarly equipped, in which the steam pressure is maintained at a lower point than is the case with the first receptacle so that all the heat value of the reaction product can be fully availed of. The discharge outlet of this second receptacle would be connected with any desired system of thickeners and fillers for the recovery of solid particles of basic alum from the mother liquor, which mother liquor is, of course, to be further treated or utilized for the recovery of its values.

My invention will be best understood as described in connection with the drawing which is a more or less diagrammatic elevation, partly in section, of the apparatus embodying my invention.

In the drawing, A indicates a continuous delivery autoclave of the type described and claimed in the Steuart application, Serial Number 606,786 now Patent No. 1,964,389. B indicates a feed device adapted to deliver a continuous flow of a normal alum solution to the top of the autoclave. C indicates a delivery pipe connected to the bottom of the autoclave and provided, as shown, with a regulating valve $C^1$. D indicates a steam manifold connected with a source of steam under pressure, not shown, as by a pipe $D^1$. From the manifold lead pipes $D^2D^2D^2$, opening, as shown, into the outside of the autoclave and each provided with a regulating valve as indicated at $D^3$. E indicates a source of air under pressure connected to the upper portion of the autoclave, which upper portion, indicated at $A^1$, is, during the reaction carried on in the autoclave, charged with air under pressure. It will be understood, of course, that the autoclave and other parts exposed to the charge in the autoclave, must be so constructed or made of such material as not to be reactive to the sulphuric acid generated in the reaction.

F indicates a receptacle into which opens the delivery pipe C of the autoclave and in which a steam pressure of a determined amount is maintained, as shown, by means of a constant pressure outlet valve, indicated at G and located, as shown, in an outlet pipe H, through which connection is made for the delivery of steam to any points of use or storage, as indicated by labels on the drawing. I indicates an outlet conduit for liquid and solid precipitate which is provided with a regulating valve, as indicated at J and, as shown, enters a second receptacle f in which steam pressure is maintained by means of a constant pressure valve, indicated at g, located in an outlet conduit h, through which steam is conducted to any points of use, as indicated by labels. The outlet for the liquid and solid contents of the receptacle is indicated at i and its regulating valve at j. This delivery pipe in ordinary construction will, as indicated by labels, carry the liquid and precipitate to thickeners and filters for separating the precipitate from the mother liquor.

As indicated on the drawing, the delivery pipe from the autoclave, C, may, with advantage, enter the receptacle in such a manner as to deliver the reaction product approximately tangentially so as to maintain the contents of the receptacle in an energetic circulation and, as indicated, a number of autoclaves may be and in practice will be connected with the receptacle F as, for instance, at the points indicated at c, c. K and k indicate liquid level gauges for the receptacles F and f and a convenient level for the liquid in the receptacles is indicated at L and l.

In operation the liquid contents of the autoclave is raised to reaction temperatures of from 140° to 200° C. and where high pressure steam is used as a heating medium, as indicated in the drawing, the solution introduced into the autoclave is diluted. After the reaction is completed in the autoclave, which, when live steam is used as a heating medium, will require but a short time, say ten minutes, the reaction products are discharged through the delivery pipe of the autoclave into the receptacle F and, as the pressure in this receptacle is maintained at a considerably lower degree than that existing in the autoclave, for example, at, say forty pounds (40 lbs.) a large part of the water in the receptacle passes at once into steam and is delivered through the conduit H to any points of storage or use. The liquid contents of the receptacle F carrying the precipitate of basic alum in suspension now reduced to a temperature corresponding with forty pounds (40 lbs.) pressure, is drawn off into the receptacle f in which a constant pressure of one to two pounds is maintained by the valve g. The low pressure steam is drawn off through pipe h to points of use, as indicated, and the liquid contents of this receptacle may then be drawn off through its outlet conduit i and delivered to thickeners and filters for the separation of the precipitate from the mother liquor which, having been considerably concentrated, owing to the steam generated from it, can then be handled or treated for the reclamation of its values.

While my apparatus preferably involves the use in combination with the receptacle F and preferably with the receptacles F and f, of autoclaves in which the alum solution is heated by the injection of high pressure steam and preferably also of autoclaves constructed in such manner as to permit and require a continuous flow of solution through them, it will be understood that the advantages of my construction can be, to a greater or less extent, availed of with any construction and mode of operation of the autoclave element.

Having now described my invention, what I claim as new and desire to secure by Letters Patent, is:

1. In apparatus for the manufacture of basic alum, comprising an autoclave adapted to contain a solution of a normal alum under pressure, means for heating the contents of the autoclave to a reactive temperature and a discharge conduit adapted to give passage to the liquid and solid content of the autoclave, the combination therewith of a receptacle connected with the discharge conduit of the autoclave so as to receive therefrom the liquid and solid content of the autoclave, means operative to maintain an approximately even pressure in said receptacle, a steam conduit connecting said receptacle to points of use for steam drawn from the receptacle and a valve controlled discharge passage leading from the receptacle for drawing off the liquid and solid contents thereof.

2. In apparatus for the manufacture of basic alum, comprising an autoclave adapted to contain a solution of a normal alum under pressure, means for heating the contents of the autoclave to a reactive temperature and a discharge conduit for the liquid and solid content of the autoclave, the combination therewith of a receptacle connected with the discharge conduit of the autoclave, means operative to maintain an approximately even pressure in said receptacle, a steam conduit connecting said receptacle to points of use for steam drawn from the receptacle, a valve controlled discharge passage leading from the receptacle for drawing off the liquid and solid contents thereof, a second receptacle connected to receive the liquid and solid matter drawn off from the first receptacle, means operative to maintain the pressure in said second receptacle at an approximately even point, a steam conduit connecting said second receptacle to points of use for steam drawn from the receptacle and a valve controlled discharge passage leading from said second receptacle for drawing off the liquid and solid contents thereof.

3. Apparatus as called for in claim 1, in which the means for heating the contents of the autoclave to reactive temperatures consists of means for injecting high pressure steam into the autoclave.

4. Apparatus as called in claim 1, in which the autoclave is provided with means for creating a constant flow of liquid under treatment into and out of the autoclave.

5. Apparatus as called for in claim 1, in which the autoclave is provided with means for creating a constant flow of liquid under treatment into and out of the autoclave, in which the means for heating the contents of the autoclave consists of means for injecting high pressure steam into the autoclave.

ARTHUR FLEISCHER.